United States Patent
Silverstein et al.

(10) Patent No.: US 11,417,228 B2
(45) Date of Patent: *Aug. 16, 2022

(54) MODIFICATION OF EXTENDED REALITY ENVIRONMENTS BASED ON LEARNING CHARACTERISTICS

(71) Applicant: International Business Machines Corporation, Armonk, NY (US)

(72) Inventors: Zachary A. Silverstein, Jacksonville, FL (US); Sarbajit K. Rakshit, Kolkata (IN); Robert Huntington Grant, Atlanta, GA (US); Haley Ashlin, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 427 days.

This patent is subject to a terminal disclaimer.

(21) Appl. No.: 16/574,620

(22) Filed: Sep. 18, 2019

(65) Prior Publication Data

US 2021/0082299 A1    Mar. 18, 2021

(51) Int. Cl.
    *G09B 5/02*      (2006.01)
    *G09B 9/00*      (2006.01)
    *H04L 29/08*     (2006.01)
    *G06F 3/01*      (2006.01)
    (Continued)

(52) U.S. Cl.
    CPC .............. *G09B 5/02* (2013.01); *G06F 3/011* (2013.01); *G06T 19/006* (2013.01); *G09B 9/00* (2013.01); *H04L 67/306* (2013.01)

(58) Field of Classification Search
    CPC .. G09B 5/02; G09B 9/00; G06F 3/011; G06F 2203/011; G06T 19/006; H04L 67/306; H04L 67/125
    See application file for complete search history.

(56) References Cited

U.S. PATENT DOCUMENTS 10,120,413 B2    11/2018    Aimone et al.
10,871,823 B1*   12/2020    Burgess .................. G06T 7/246
                 (Continued)

FOREIGN PATENT DOCUMENTS

KR        20190004088        1/2019

OTHER PUBLICATIONS

List of IBM Patents or Patent Applications Treated as Related, Nov. 7, 2019, 2 pgs.
(Continued)

*Primary Examiner* — Beau D Spratt
*Assistant Examiner* — Parmanand D Patel
(74) *Attorney, Agent, or Firm* — Peter K. Suchecki

(57) ABSTRACT

Provided is a method, computer program product, and system for modifying a simulation based on learning characteristics. A processor may receive a user profile associated with a user. The user profile includes a set of learning characteristics related to the user. The processor may display a simulation on an extended reality display. The displayed simulation is based in part on the set of learning characteristics. The processor may monitor focus data related to the user. The focus data is generated while the user is viewing the simulation. The processor may compare the focus data with one or more focus thresholds. The processor may modify the simulation in response to the one or more focus thresholds being met.

17 Claims, 6 Drawing Sheets

(51) Int. Cl.
    *G06T 19/00*    (2011.01)
    *H04L 67/306*    (2022.01)

(56) References Cited

U.S. PATENT DOCUMENTS

| | | | |
|---|---|---|---|
| 2011/0177480 A1* | 7/2011 | Menon | G09B 7/00 |
| | | | 434/238 |
| 2011/0258049 A1* | 10/2011 | Ramer | G06Q 30/0273 |
| | | | 705/14.69 |
| 2014/0361971 A1* | 12/2014 | Sala | G06F 3/013 |
| | | | 345/156 |
| 2015/0310751 A1 | 10/2015 | Tolia | |
| 2015/0348330 A1 | 12/2015 | Balachandreswaran et al. | |
| 2015/0367239 A1 | 12/2015 | Epstein | |
| 2019/0005831 A1 | 1/2019 | Seaton | |
| 2019/0354174 A1 | 11/2019 | Young et al. | |
| 2020/0097077 A1* | 3/2020 | Nguyen | G06F 3/0482 |
| 2020/0356884 A1* | 11/2020 | Ozoka | G06Q 50/01 |
| 2020/0409455 A1* | 12/2020 | Wilson | G02B 27/017 |

OTHER PUBLICATIONS

Silverstein, et al., "Modification of Extended Reality Environments Based on Learning Characteristics," U.S. Appl. No. 16/680,027, filed Nov. 11, 2019.

Andersen et al., "Augmented Reality Concentration Cubicle," IP.com Disclosure No. IPCOM000249206D, Publication Date: Feb. 9, 2017, 6 pgs.

Anonymous, "Method and System for Delivering Instructional Information to Students based on Cognitive Aspects." IP.com Disclosure No. IPCOM000256190D, Publication Date: Nov. 12, 2018, 4 pgs.

Carnegie Learning, "What's New? MATHia's Exciting New Look, Features and Content," https://www.carnegielearning.com/blog/whats-new-mathia/, printed Sep. 13, 2019, 8 pgs.

Delaney et al., "Augmented Reality Enabled Motion Sickness Reduction," U.S. Appl. No. 16/511,812, filed Jul. 15, 2019.

IBM Research, "Computer Vision and Augmented Reality," Technology and solutions for Object Recognition and Augmented Reality applications on cloud and mobile platforms, http://www.research.ibm.com/haifa/dept/imt/ist_dm.shtml, printed Jul. 18, 2019, 3 pgs.

Kennesaw, "Professor using VR to aid learning among students with autism." Apr. 10, 2019 [Accessed Jun. 1, 2019] https://www.newswise.com/articles/professor-using-vr-to-aid-learning-among-students-with-autism, 3 pgs.

Mei et al., "Enable an Innovative Prolonged Exposure Therapy of Attention Deficits on Autism Spectrum through Adaptive Virtual Environments," 2018 10th International Conference on Virtual Worlds and Games for Serious Applications (VS-Games), Wurzburg, 2018, pp. 1-4.

PRNewswire, "Future of Global Digital Reality Market, Forecast to 2021—VR Application in the Manufacturing Sector is Projected to Increase by 98.9% Between 2017 and 2021," https://www.prnewswire.com/news-releases/future-of-global-digital-reality-market-forecast-to-2021—vr-application-in-the-manufacturing-sector-is-projected-to-increase-by-98-9-between-2017-and-2021-300716802.html, Sep. 21, 2018, 4 pgs.

Ragan et al., "The Effects of Navigational Control and Environmental Detail on Learning in 3D Virtual Environments," 2012 IEEE Virtual Reality Workshops (VRW), Costa Mesa, CA, 2012, pp. 11-14.

Science Daily, "In VR boys learn best when the teacher is a drone—girls lean (sic) better from virtual Marie: Teachers make all the difference—also in virtual reality teaching," https://www.sciencedaily.com/releases/2019/01/190108095108.htm, printed Jul. 18, 2019, 2 pgs.

Wade et al., "A Gaze-Contingent Adaptive Virtual Reality Driving Environment for Intervention in Individuals with Autism Spectrum Disorders." ACM Trans. Interact. Intell. Syst. 6, 1, Article 3 (Mar. 2016), 23 pages.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

MODIFICATION OF EXTENDED REALITY ENVIRONMENTS BASED ON LEARNING CHARACTERISTICS

BACKGROUND

The present disclosure relates generally to the field of extended reality, and more specifically, to modifying a simulation based on learning characteristics associated with a user.

In learning environments, users typically digest information in various ways. Some users may prefer learning environments with few distractions and straight forward learning content, while other users may become bored without varying the content. In some learning environments, users may utilize extended reality systems (e.g., virtual reality, augmented reality, mixed reality, etc.) to aid in the learning process.

SUMMARY

Embodiments of the present disclosure include a method, computer program product, and system for modifying a simulation based on learning characteristics. A processor may receive a user profile associated with a user. The user profile includes a set of learning characteristics related to the user. The processor may display a simulation on an extended reality display. The displayed simulation is based in part on the set of learning characteristics. The processor may monitor focus data related to the user. The focus data is generated while the user is viewing the simulation. The processor may compare the focus data with one or more focus thresholds. The processor may modify the simulation in response to the one or more learning thresholds being met.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
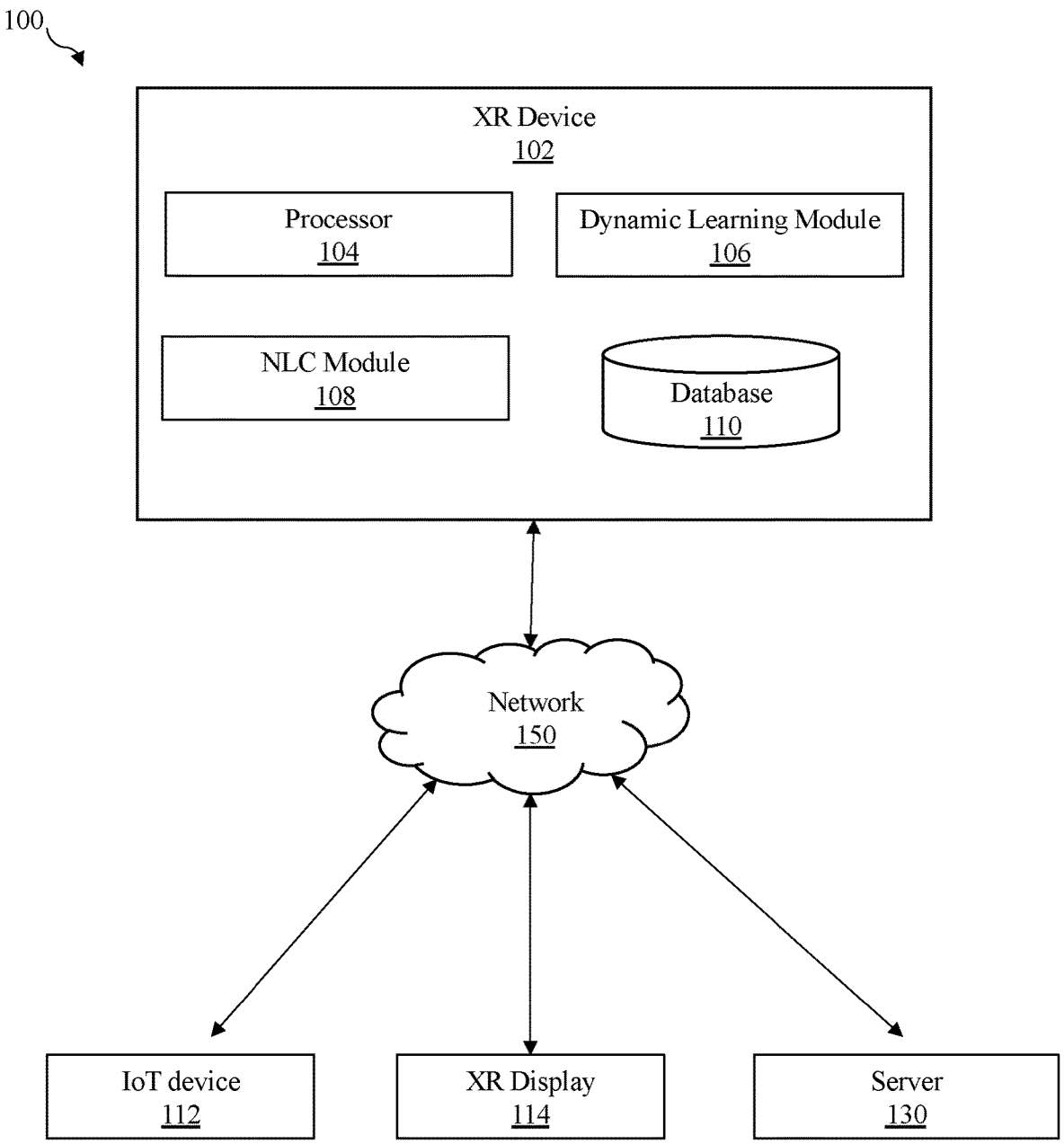
FIG. 1 illustrates a block diagram of an extended reality system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of extended reality (XR), and more particularly to modifying a simulation based on learning characteristics. While the present disclosure is not necessarily limited to such applications, various aspects of the disclosure may be appreciated through a discussion of various examples using this context.

In learning environments, users typically digest information in various ways. Some users may prefer learning environments with few distractions and straight forward learning content, while other users may become bored without varying the content. In some learning environments (e.g., e-learning environments), users may utilize XR systems (e.g., virtual reality (VR), augmented reality (AR), mixed reality (MR), etc.) to aid in the learning process. For example, an XR system may include a headset worn by a user to display relevant educational content. For example, a student may wear an XR headset that augments their current classroom environment. The XR headset may overlay/display various virtual artifacts (e.g., images, sounds, obfuscated/occluded objects, text, etc.) that are not present in the actual classroom to aid the students in learning.

Aspects of the present disclosure relate to modifying a simulation (e.g., VR simulation, AR simulation, etc.) generated by an XR system based on learning characteristics associated with a user. In embodiments, the XR system may receive a user profile associated with a user. For example, the system may receive the user's profile when the user logs into the XR system during a learning session. The user profile includes a set of learning characteristics related to the user. The user profile may include historical information related to the user, such as grade reports, XR interaction data (e.g., focus data, biometric data, etc.) related to learning patterns of the user when using the XR system, and/or manual entries regarding the user's learning abilities (e.g., learning preferences, subjects the user has difficulty with, subjects/topics the user enjoys, etc.). The XR system may analyze the set of characteristics in the user profile by utilizing natural language computing (NLC) (e.g., natural language processing and/or understanding). The user profile may be stored on the XR system or accessible through a server (e.g., cloud server/database).

Once the user profile is received, the XR system displays a simulation on a communicatively coupled XR display (e.g., XR headset, XR screen, etc.). The displayed simulation is based, in part, on the set of learning characteristics taken from the user profile. For example, based on one or more learning characteristics (e.g., entries indicating user performs better with few distractions) the XR system may display a clean background on the XR display where all non-critical content (e.g., artifacts/objects not related to the learning session, pictures on the wall of the classroom, other students within the classroom, etc.) are occluded from the display, while relevant or critical content remain visible (e.g., the teacher, notes on a whiteboard, virtual artifacts related to the session, etc.). In embodiments, the XR system may use NLC to determine, via context/image recognition and parsing of written and spoken content, which artifacts are critical to the learning session. In another example, the XR system may display a simulation having a more interesting background (e.g., animated background in relation to a teacher/speaker) in order to help a user that has difficulty focusing during a learning session, as indicated by the user's learning characteristics. In this way, the XR system will display a simulation that is best suited for the respective user's style of learning based on user profile information.

Once the simulation is displayed, the XR system may monitor focus data from one or more communicatively coupled IoT devices related to the user. For example, the XR system may monitor biometric data from various wearable devices (e.g., smart watch, smart band, smart chair, etc.) to determine the focus of the user (e.g., by monitoring heart rate). In embodiments, the XR system may use image recognition (e.g., IoT camera, XR headset camera, etc.) to track eye focus and concentration of the user. Once the focus data is generated, the XR system may compare the focus data to one or more focus thresholds related to the respective user.

In embodiments, the focus thresholds may be based in part on correlating historical focus data of the user and the set of learning characteristics. For example, the XR system may generate a focus threshold relative to the user's historic heart rate data and/or eye focus data in relation to various performance factors (e.g., increased focal content and/or concentration metrics for specific simulation backgrounds, improvements in grades over time while utilizing the XR system, etc.) when learning about a specific subject. In embodiments, the focus thresholds may be set at a level where the XR system has determined the student typically loses concentration for a specific subject. For example, the system may determine a student is not paying attention to a teacher during a learning session (e.g., a math lecture) when the user's heart rate falls below a certain level (e.g., 65 beats/min) and/or the user's eyes fail to observe the teacher over a specific percentage or length of time (e.g., 1 minute, 80% of the lecture, etc.). When the XR system determines one or more focus thresholds are met, it may indicate the user is becoming bored when learning the specific topic.

In response to meeting the threshold, the XR system will modify the simulation according to the set of learning characteristics within the user's profile. For example, a user that prefers a clean background (e.g., obfuscating everything but the teacher) during the learning session may become unfocused/bored over time during the learning session and need a diversion to help refocus. For example, the user profile of a user that prefers less distractions may indicate the user prefers animated sports artifacts/objects to help the user refocus during a learning session. Once the XR system determines the user is losing focus (e.g., by focus data meeting a focus threshold) the system may modify the background of the simulation by including an animated sports artifact (e.g., baseball playing throwing a ball) to grab the user's attention to help them refocus on the teacher and/or learning session. Once the user is determined to be refocused (e.g., based on eye focus data regarding the teacher) the system may remove the animated sports artifact leaving the clean background within the simulation.

In embodiments, the XR system may utilize various feedback models to determine learning characteristics associated with each user. For example, the XR system may utilize a feedback loop to determine a focus level or range of the user when various virtual artifacts and/or objects are displayed. For example, by displaying artifacts that the user finds appealing (e.g., various colors, gradients, environments, animations, pictures, etc.), the XR system may monitor focus data and determine a highest focus level or range for artifacts the user finds appealing. Alternatively, the XR system may determine a low focus level or range for artifacts that fail to increase the user's focus level by monitoring interaction data. In this way, the XR system determines what artifacts to display in order to keep the user's attention while participating in an XR learning environment.

In embodiments, the XR system may group users having similar learning characteristics and focus patterns obtained from their user profiles. The groupings may be determined from analyzing crowdsourcing data from multiple users. For example, users that require constant virtual artifacts to maintain concentration and focus may be grouped in a first learning type, while users that require a learning environment with little to no distractions may be grouped in a second learning type. Once the groupings are determined, the XR system may modify the simulation for a user based on which group the user's learning characteristics fall into. In this way, the XR system can improve modification of the simulation to provide learning environments to users based on which modifications worked best for other users having similar learning characteristics.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an extended reality (XR) system 100, in accordance with embodiments of the present disclosure. In the illustrated embodiment, XR system 100 includes XR device 102 that is communicatively coupled to XR display 114, IoT device 112, and server 130 via network 150. XR device 102, IoT device 112, XR display 114, and server 130 may be any type of computer system and may be substantially similar to computer system 1101 of FIG. 5.

IoT device 112 may be any type of device (e.g., smart watch, smart band, smart phone, tablet, smart chair, camera, speaker, etc.) configured to generate focus data related to the user. For example, IoT device 112 may be a smart band that generates biometric data (e.g., heart rate data) that is used to indicate the focus of a user during a learning session. In another example, IoT device 112 may be a camera that utilizes image recognition data to determine the focus of a user's eyes during a learning session.

XR display 114 may be any type of user interface configured to display a simulation (e.g., VR simulation, AR simulation, MR simulation, etc.). For example, XR display 114 may be an augmented reality (AR) headset or virtual reality (VR) headset worn by a user.

Network 150 may be any type of communication network, such as a wireless network or a cloud computing network. The network 150 may be substantially similar to, or the same as, cloud computing environment 50 described in FIG. 6. In some embodiments, the network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium.

For example, XR device 102 may communicate with IoT device 112, XR display 114, and server 130 using a WAN, one or more hardwire connections (e.g., an Ethernet cable) and/or wireless communication networks. In some embodiments, the various systems may be communicatively coupled using a combination of one or more networks and/or one or more local connections. For example, XR device 102 may communicate with server 130 using a hardwired connection, while communication between the XR device 102, IoT device 112, and XR display 114 may be through a wireless communication network.

In the illustrated embodiment, XR device 102 includes processor 104, dynamic learning module 106, NLC module 108, and database 110.

In embodiments, dynamic learning module 106 is configured to determine a user's preferred learning content delivery when viewing a simulation on XR display 114. Dynamic learning module 106 may comprise various machine learning engines (artificial neural network, correlation engines, reinforcement feedback learning model, supervised/unsupervised learning model, etc.) configured to analyze various data (e.g., focus data, biometric data, performance factors, learning characteristics, etc.) generated by XR system 100.

In embodiments, dynamic learning module 106 may ingest various data related to the user from a user profile. The user profile may be retrieved from database 110 or from server 130. In embodiments, dynamic learning module 106 may analyze educational reports (e.g., report cards, tests, behavioral reports, etc.), educational content (e.g., books the user likes, topics the user prefers), and/or curriculum associated with the user to determine content delivery preferences and/or focus levels of the user. For example, dynamic learning module 106 may analyze text from the educational reports and educational content by using NLC module 108 to determine which subjects the user performs well in, which subjects the user has experienced difficulty, and what types of visual content the user prefers. In embodiments, external educational reports/content/curriculum may be accessed, with consent from the user, from a repository located on server 130.

In embodiments, dynamic learning module 106 may analyze user focus (e.g., through focus data received from IoT device 112) by utilizing a feedback loop to determine the user's focus level when interacting with various artifacts or objects displayed within the simulation. For example, during system training, dynamic learning module 106 may display both artifacts that are preferred by the user (e.g., determine through user profile information) and/or not preferred (e.g., indicated by low focus data) by the user to determine which artifacts are critical for a successful learning environment. Once artifacts and/or proper obfuscation of non-critical artifacts are determined, the dynamic learning module 106 may alter content delivery within XR display 114 accordingly to provide the best simulation for each learning session for the user.

In embodiments, dynamic learning module 106 may use analyzed educational reports and learned focus data to generate a set of learning characteristics for each respective user. For example, using the analyzed education reports and learned focus data, dynamic learning module 106 may determine that the user prefers limited distractions while in a learning session. Dynamic learning module 106 will display a limited or clean background when the user is viewing the simulation on XR display 114. However, the user may become bored or tired during the learning session and require a diversion to maintain focus during the learning session. Dynamic learning module 106 may utilize the user's profile and learning characteristics to determine that the user likes various topics, such as sports. When the dynamic learning module 106 detects the user is becoming disinterested, the XR system may display or interject a sports related image within the simulation to help maintain the user's focus.

In embodiments, dynamic learning module 106 may use various techniques to occlude any artifacts that are not critical to the learning session. For example, dynamic learning module 106 may utilize content and/or image recognition with a combination of semantic and parsing of written and spoken text using NLC module 108 to determine what artifacts are critical to the learning session. Critical content (e.g., artifacts related to the learning session and/or preferred by the user) will remain in the simulation while non-critical content (e.g., artifacts not related to the learning material) will be hidden.

In embodiments, dynamic learning module 106 may utilize gamification to determine the user's preferred learning method. For example, dynamic learning module 106 may present various XR games to the user to determine which aspects (e.g., focus, concentration, reaction speed, memory, etc.) of the game the user scores highest in and correlate those aspects with the user's learning characteristics within the associated user profile. Once determined, dynamic learning module 106 may modify simulations during learning sessions based on those learning characteristics.

In embodiments, dynamic learning module 106 may analyze historical focus data and previous learning data to build profile sets for various levels of preferred content delivery. For example, the dynamic learning module 106 may use k-nearest neighbor (KNN) clustering to build the profile sets for generating various focus thresholds (e.g., limited distractions, medium distractions, and/or heavy distractions) relative to various subjects based on the user's user profile and historical learning data. For example, dynamic learning module 106 may utilize a medium distraction focus threshold for a user when participating in a learning session regarding mathematics based on historical learning data. For example, the user may only require limited/medium diversions to maintain focus while learning about math because the user has shown to be interested in the subject through both educational reports and collected focus data. In this way, when dynamic learning module 106 detects the user is becoming disinterested in the respective learning session (e.g., meeting the threshold), dynamic learning module 106 will display various artifacts or reduce irrelevant artifacts within the display to improve the user's attention/focus during the learning session. This allows the user to maintain focus during the learning session by positively reinforcing the target learning material.

In embodiments, the dynamic learning module 106 may track performance factors of each user over a time period and adjust the focus thresholds accordingly. For example, dynamic learning module 106 may track the grades of a student as they progress through various levels of schooling (e.g., grammar school, high school, etc.) and adjust the various focus thresholds as the performance of the student increases. For example, as the student ages (e.g., from a child to a young adult) the focus data and/or changing in learning characteristics may indicate that the student does not necessitate as many diversions or interjections of artifacts to maintain focus while in a learning session. In this way, over time, the dynamic learning module 106 can become more accurate in properly adjusting the simulation according to the user's learning characteristics.

FIG. 1 is intended to depict the representative major components of the XR system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the XR system 100 may not be present, and the arrangement of components may vary.

For example, while FIG. 1 illustrates an example XR system 100 having a single XR device 102, a single IoT device 112, a single XR display 114, and a single server 130, suitable network architectures for implementing embodiments of this disclosure may include any number of XR devices, IoT devices, XR displays, and servers. The various models, modules, systems, and components illustrated in FIG. 1 may exist, if at all, across a plurality of XR devices, IoT devices, XR devices, and servers.

Figure 2:
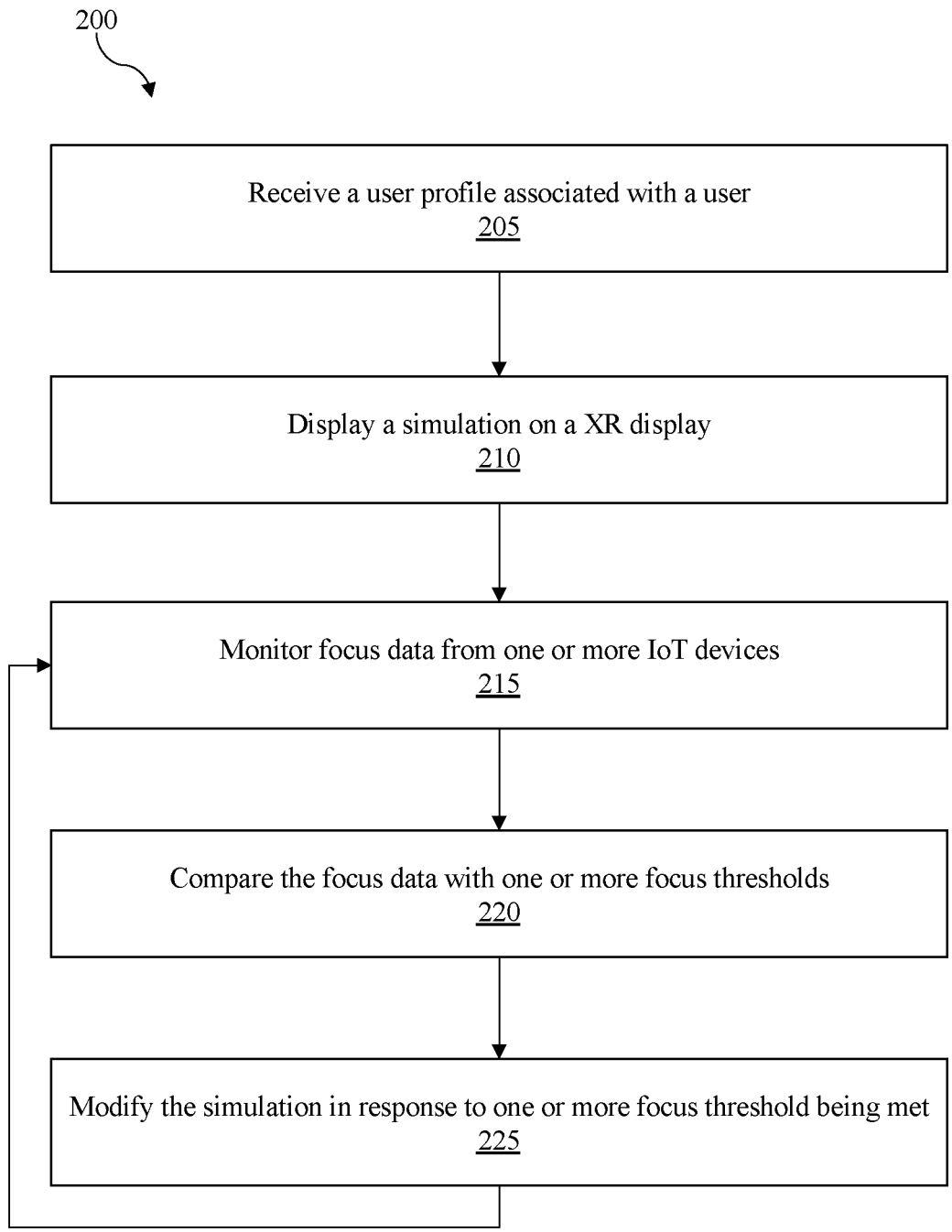
FIG. 2 illustrates a flow diagram of an example process for modifying a simulation based on learning characteristics, in accordance with embodiments of the present disclosure.

Referring now to FIG. 2, shown is a flow diagram of an example process 200 for adjusting a simulation based on learning characteristics, in accordance with embodiments of the present disclosure. The process 200 may be performed by processing logic that comprises hardware (e.g., circuitry, dedicated logic, programmable logic, microcode, etc.), software (e.g., instructions run on a processor), firmware, or a combination thereof. In some embodiments, the process 200 is a computer-implemented process. The process 200 may be performed by processor 104 exemplified in FIG. 1.

The process 200 begins by receiving a user profile associated with a user. This is illustrated at step 205. For example, an XR system may receive the user profile when the user logs into a communicatively coupled XR device or XR display. For example, the user may be participating in an XR learning session where the user is wearing an XR headset that augments the teaching environment around the user through a display. The user profile includes a set of learning characteristics related to how the user ingests information when participating in a learning environment.

In embodiments, the set of learning characteristics may include behavioral data, focus data, learning history, grades for various subjects, educational content (e.g., books, topics, themes, etc.) that the user prefers, and the like. For example, the set of learning characteristics may be generated in part from analyzing the user's learning abilities derived from a set of educational reports related to the user by using natural language computing (NLC). In this way, the XR system may determine what subjects the user performs well in and what subjects the user may need more assistance. In another example, the XR system may use NLC to analyze various books read by the user and extract relevant topics of the book that interest the user. For example, the XR system may determine that the user is interested in motorcycles by analyzing written content pertaining to motorcycles from a set of books the user prefers.

In some embodiments, the set of learning characteristics may be generated in part through gamification and may be correlated with the data derived from the educational reports. For example, the XR system may apply typical elements of game playing (e.g., point scoring, competition with others, rules of play, focus/concentration elements, etc.) to determine what types of learning techniques the user responds to best and correlate these techniques with the user's profile. For example, the XR system may determine the user scores better when there is a clean simulation background and limited noise during gameplay rather than a messy background filled with distracting artifacts (e.g., animations, noise, etc.). In this way, the XR system may determine the best simulation type for each user when participating in a learning session and adjust the artificial simulation according to the determined set of learning characteristics associated with the user's profile.

The process 200 continues by displaying, in response to receiving the user profile, a simulation on a XR display. This is illustrated at step 210. The simulation is displayed based in part on the set of learning characteristics. For example, the XR system may display a clean background on the XR display because the set of learning characteristics indicates the user performs well when there are limited distractions during a learning session. The XR system will occlude any non-relevant artifacts (e.g., distractions within the environment, other students in the classroom, etc.), while displaying relevant artifacts (e.g., a teacher, words on a white board, etc.) associated with the learning session.

In another example, a second user's learning characteristics may indicate the second user performs better when more interesting simulations are displayed because the second user becomes easily bored and/or unfocused. The XR system may present a simulation that includes various animations that the second user prefers while still displaying the relevant artifacts associated with the simulation. For example, the second user's learning characteristics may indicate the second user is an avid fisherman but easily loses focus when learning about history. Using the set of learning characteristics in the second user's profile, the XR system may display a virtual aquarium background with fish swimming around the teacher during a learning session related to history to aid the user in staying focused. In this way, the XR system utilizes various topics and or techniques preferred by the user to help each respective user maintain their highest level of focus during a learning session.

The process 200 continues by monitoring focus data from one or more communicatively coupled IoT devices. This is illustrated at step 215. The focus data may be any type of data (e.g., biometric data, eye movement data, etc.) that indicates a user's focus level while viewing the simulation. For example, during a learning session the XR system may monitor the user's focus during the learning session by analyzing biometric data received from a smart band indicating the user is becoming bored (e.g., by monitoring heart rate). In another example, the XR system may monitor the user's eyes (e.g., through image recognition using an IoT camera, camera on the XR headset, etc.) to determine if the user is paying attention to the teacher during the learning session. In some embodiments, the system may utilize a feedback loop to capture the focus data of the user when viewing the simulation.

The process 200 continues by comparing the focus data with one or more focus thresholds. This is illustrated at step 220. For example, the XR system will compare the biometric data received from the smart band to a focus threshold relative to heart rate. The XR system may determine the user is losing focus when their heart rate falls below a minimum threshold (e.g., 60 beats/min). In another example, the XR system may determine the user is losing focus when image recognition data indicates the user has not looked at the teacher for more than a certain period of time (e.g., 5 mins).

In embodiments, the focus thresholds are based in part on correlating historical focus data of the user and the set of learning characteristics. For example, the XR system may be initially trained using a feedback loop when utilized by each user. As a user is using the XR system, focus data is collected by the system to determine types of artifacts or components the user maintains focus on. This focus data may be correlated with the user's learning characteristic to determine respective focus thresholds that will improve the user's concentration when viewing a simulation during a learning session.

The process 200 continues by modifying the simulation in response to the one or more focus thresholds being met. This is illustrated at step 225. For example, the XR system may determine that the user is becoming bored during the learning session because the focus data (e.g., biometric data and/or eye focus data) has met a certain threshold level. Based on the set of learning characteristics from the user profile, the XR system will modify the simulation accordingly to increase the user's focus during the learning session. For example, a user that prefers a clean background may become bored over time. When the XR system detects the loss of focus, the system will display an artifact the user prefers. For example, the XR system may display an animated racecar (e.g., based on the user's interest in racecars from the set of learning characteristics in the user profile) when the user is losing focus in order to grab the user's attention. Once the simulation is modified, the process 200 may return to step 215 to monitor focus data of the user. If the user's focus does not improve, the system may modify the simulation using different artifacts (e.g., displaying other artifacts the user prefers, changing the background color, increasing volume, etc.) based on the set of learning characteristics. In this way, the XR system will continually analyze whether the simulation needs further modification based on the user's focus data.

Figure 3:
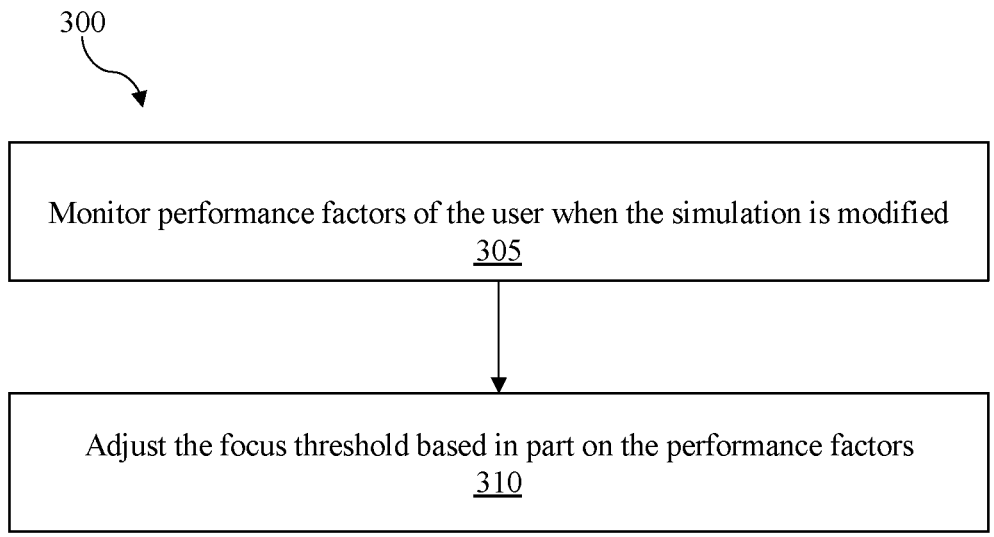
FIG. 3 illustrates a flow diagram of an example process for adjusting one or more thresholds based on performance factors, in accordance with embodiments of the present disclosure.

Referring now to FIG. 3, shown is a flow diagram of an example process 300 for adjusting the one or more thresholds based on performance factors, in accordance with embodiments of the present disclosure. Process 300 may be in addition to or a subset of process 200. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. The process 300 may be performed by processor 104 exemplified in FIG. 1.

The process 300 begins by monitoring one or more performance factors of the user in response to the simulation being modified. This is illustrated at step 305. The performance factors may be any type of metric that measures a user's progress related to a learning session and/or simulation. For example, the performance factors may include grading and/or progress reports in subjects that were discussed in the learning session. In embodiments, the XR system will continually monitor and track performance factors of the user after the simulation is modified. For example, the XR system will monitor, in response to displaying a new artifact or obfuscating a distraction, if performance factors related to the user have increased/decreased over time (e.g., better or worse grades, increases in attention to the teacher based on focus data, etc.) after modifying the simulation. For example, the XR system may determine a group of students are talking about non-relevant topics (e.g., using NLC) and obfuscate the students from the displayed simulation related to the user. Once obfuscated, the XR system may monitor if the performance factors of the user have improved over time and, if so, the system will continually obfuscate students talking about irrelevant topics from the simulation.

The process 300 continues by adjusting the one or more focus thresholds based in part on the performance factors. This is illustrated at step 310. If the XR system has determined that the modification of the simulation has improved or not improved the performance factors of the user, then the XR system may adjust the one or more focus thresholds accordingly.

For example, performance factors may indicate a user is performing better in a respective subject associated with the learning session over time. Because the user is performing well, the XR system may adjust the focus threshold (e.g., increasing the eye focus threshold from 1 minute to 2 minutes for when a user is determined to not be looking at the teacher) for displaying artifacts in order to improve the focus of the user by balancing how often artifacts are displayed within the simulation in correlation with the user's performance factors. In another example, the XR system may identify the user as being distracted and/or unfocused when the user's heart rate has met a certain focus threshold. However, performance factors may indicate that the user is performing well in the subject related to the learning session even though their heart rate may indicate the user is distracted/unfocused. Therefore, the XR system may adjust the focus threshold related to heart rate to accurately account for the user's performance factors. Over time, the XR system may utilize the performance factors to fine tune the focus thresholds in order to find a proper balance of displaying relevant content, interjecting preferred artifacts at proper times, and/or obfuscating non-relevant content for each user.

Figure 4:
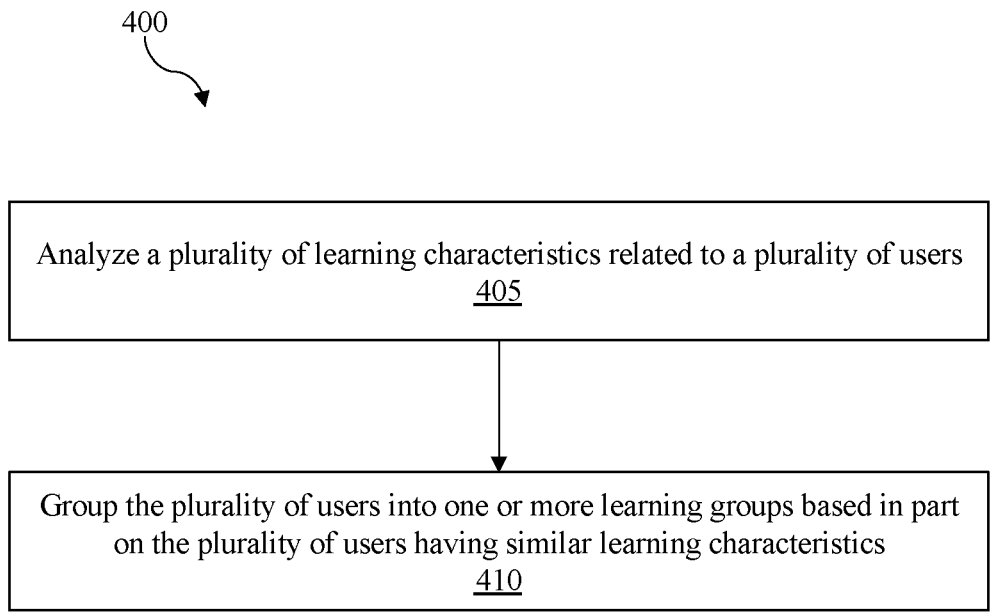
FIG. 4 illustrates a flow diagram of an example process for grouping a plurality of users into learning groups, in accordance with embodiments of the present disclosure.

Referring now to FIG. 4, shown is a flow diagram of an example process 400 for grouping a plurality of users into learning groups, in accordance with embodiments of the present disclosure. Process 400 may be in addition to or a subset of process 200 or 300. The process 400 may be performed by processing logic that comprises hardware (e.g., circuitry, dedicated logic, programmable logic, microcode, etc.), software (e.g., instructions run on a processor), firmware, or a combination thereof. In some embodiments, the process 400 is a computer-implemented process. The process 400 may be performed by processor 104 exemplified in FIG. 1.

The process 400 begins by analyzing learning characteristics and focus data related to a plurality of users. This is illustrated at step 405. The learning characteristics and focus data may be collected through crowdsourcing from multiple XR systems. The XR system may utilize a learning feedback loop to collect interaction and/or focus data when displaying various artifacts and components within simulations presented to the plurality of users.

The process 400 continues by grouping the plurality of users into one or more learning groups based in part on the plurality of users having one or more similar learning characteristics. This is illustrated at step 410. In embodiments, the XR system may derive learning characteristics and focus data by ingesting performance factors as well as eye and focal point tracking for multiple users. This data may be fed into a learning feedback loop so the XR system can detect what works best for a specific group by testing for statistical significance in both pre/post modification of the simulation. In embodiments, the XR system may segment each user into various learning types/groups based on their user profile information. For example, the XR system may determine predefined groups based on the ingestion of educational report data and cluster groups based on learning pattern and focus data. In embodiments, once the groupings are determined, the system may utilize the groups to modify the simulation for a user based, in part, on at least one of the set of learning characteristics of the user matching a learning characteristic within the one or more learning groups. In this way, the XR system may use this information to provide the best simulation and/or learning environment for each user depending on which learning group they fall in based on their user profile/learning characteristics.

Figure 5:
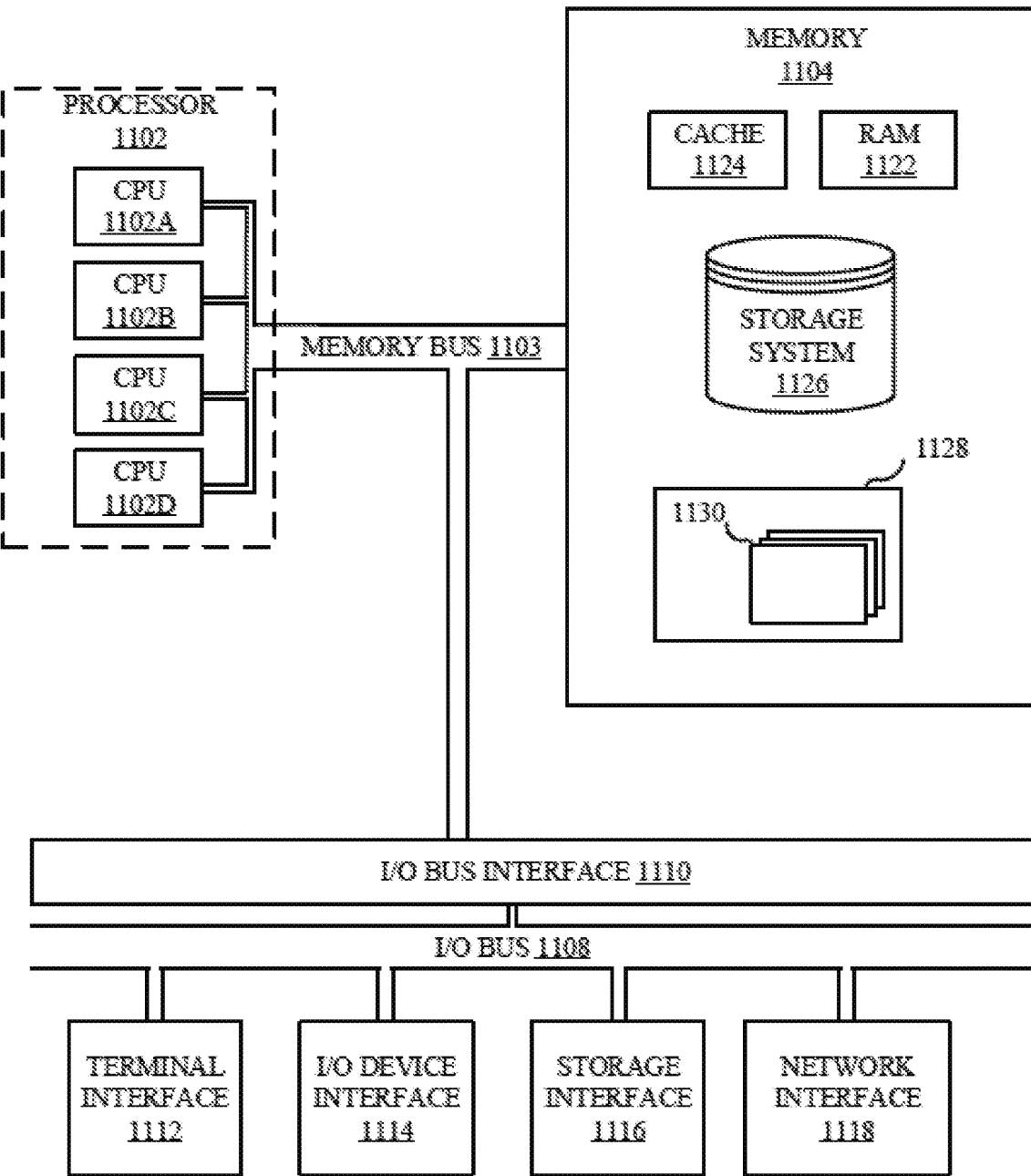
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200, 300, and 400).

System memory subsystem 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 5 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
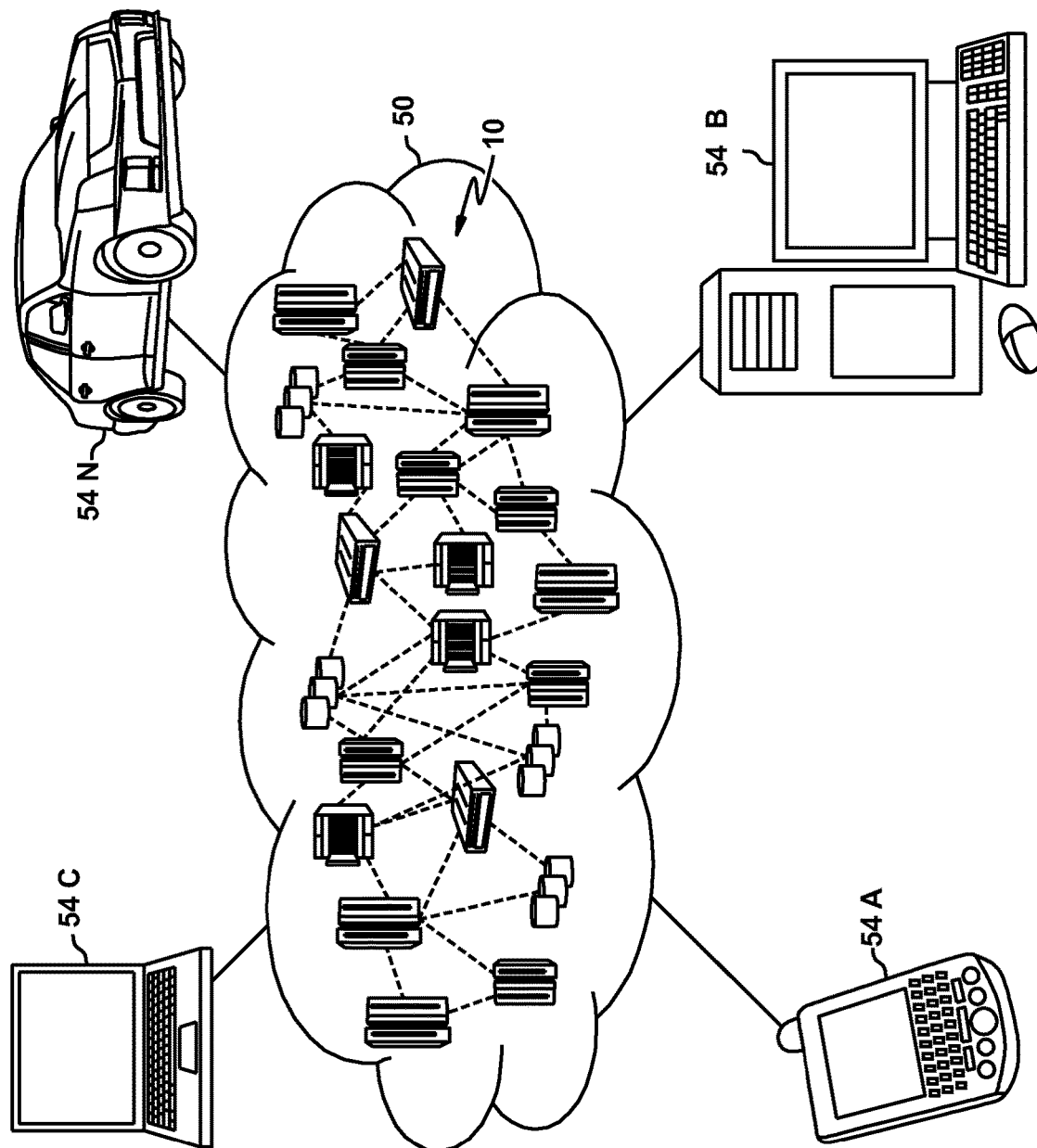
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
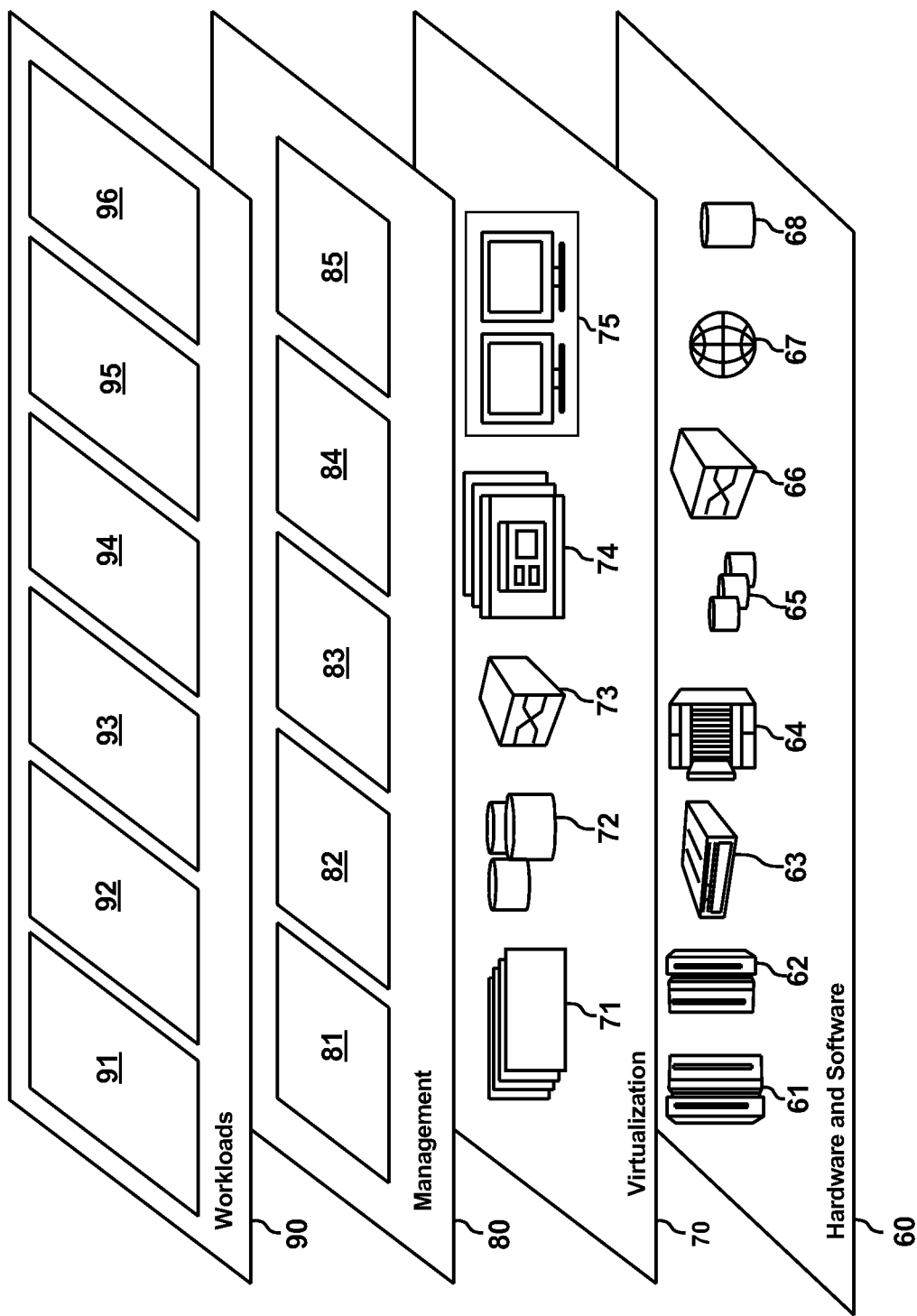
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
a processor; and
a computer-readable storage medium communicatively coupled to the processor and storing program instructions which, when executed by the processor, cause the processor to perform a method comprising:
receiving a user profile associated with a user, wherein the user profile includes a set of learning characteristics related to the user;
displaying a simulation associated with a learning session on an extended reality (XR) display, wherein non-critical content is occluded from the simulation to create a clean background surrounding critical content related to the learning session based in part on the set of learning characteristics, and wherein the non-critical content comprises objects within a learning environment that are not related to the learning session and the critical content comprises a teacher;
monitoring focus data from one or more communicatively coupled IoT devices, wherein the focus data is generated while the user is viewing the simulation;
comparing the focus data with one or more focus thresholds, wherein the focus thresholds are based in part on correlating historical focus data of the user and the set of learning characteristics; and
inserting a virtual artifact within the simulation in response to the one or more focus thresholds being met.

2. The system of claim 1, wherein the method performed by the processor further comprises:
analyzing a plurality of learning characteristics related to a plurality of users; and
grouping the plurality of users into one or more learning groups based in part on the plurality of users having one or more similar learning characteristics,
wherein the displaying of the simulation is modified based in part on at least one of the set of learning characteristics of the user matching a learning characteristic within the one or more learning groups.

3. The system of claim 1, wherein the set of learning characteristics are generated in part by analyzing a set of educational reports related to the user using natural language computing.

4. The system of claim 1, wherein monitoring focus data from one or more IoT devices utilizes a feedback loop to capture interaction of the user when viewing the simulation.

5. The system of claim 1, wherein the method performed by the processor further comprises:
monitoring one or more performance factors of the user when the simulation is modified; and
adjusting the one or more focus thresholds based in part on the performance factors.

6. The system of claim 1, wherein the virtual artifact is inserted into the clean background surrounding the critical content related to the learning session.

7. The system of claim 1, wherein the virtual artifact is determined from visual content preferences in the user profile.

8. The system of claim 7, wherein the visual content preferences are based on a focus level for virtual artifacts that the user finds appealing, and wherein the focus level is determined in part from the focus data.

9. The system of claim 8, wherein the virtual artifacts that the user finds appealing include animated virtual artifacts.

10. The system of claim 1, wherein the learning characteristics are selected from a group of learning characteristics consisting of: behavioral data, focus data, learning history, educational grades, and educational content.

11. The system of claim 1, wherein occluding non-critical content from the simulation comprises:
analyzing, using natural language computing, written and spoken content of the learning session associated to the simulation; and
determining, based on the analyzing, critical content and non-critical content related to the simulation.

12. The system of claim 1, wherein the set of learning characteristics are generated in part through gamification.

13. The system of claim 1, wherein the focus data includes heart rate data associated with the user.

14. A computer program product comprising a computer-readable storage medium having program instructions embodied therewith, wherein the computer-readable storage medium is not a transitory signal per se, the program instructions executable by a processor to cause the processor to perform a method comprising:
receiving a user profile associated with a user, wherein the user profile includes a set of learning characteristics related to the user;
displaying a simulation associated with a learning session on an extended reality (XR) display, wherein non-critical content is occluded from the simulation to create a clean background surrounding critical content related to the learning session based in part on the set of learning characteristics, and wherein the non-critical content comprises objects within a learning environment that are not related to the learning session and the critical content comprises a teacher;
monitoring focus data from one or more communicatively coupled IoT devices, wherein the focus data is generated while the user is viewing the simulation;
comparing the focus data with one or more focus thresholds, wherein the focus thresholds are based in part on correlating historical focus data of the user and the set of learning characteristics; and
inserting a virtual artifact within the simulation in response to the one or more focus thresholds being met.

15. The computer program product of claim 14, wherein the method performed by the processor further comprises:
analyzing learning characteristics and focus data related to a plurality of users; and
grouping the plurality of users into one or more learning groups based in part on the plurality of users having one or more similar learning characteristics,
wherein the displaying of the simulation is modified based in part on at least one of the set of learning characteristics of the user matching a learning characteristic within the one or more learning groups.

16. The computer program product of claim 14, wherein the set of learning characteristics are generated in part by analyzing a set of educational reports related to the user using natural language computing.

17. The computer program product of claim 14, wherein the method performed by the processor further comprises:
monitoring one or more performance factors of the user when the simulation is modified; and
adjusting the one or more focus threshold based in part on the performance factors.

* * * * *